UNITED STATES PATENT OFFICE.

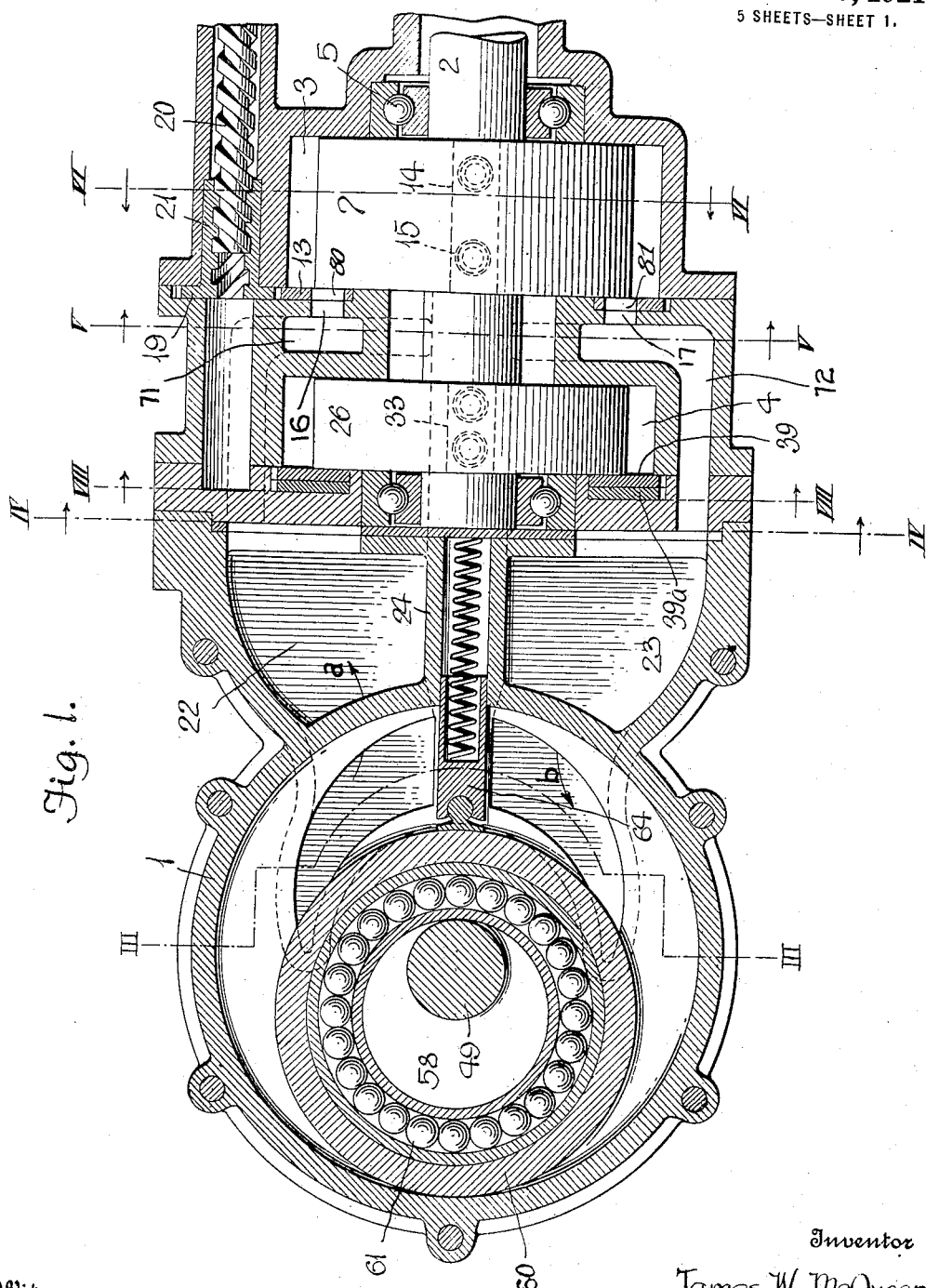

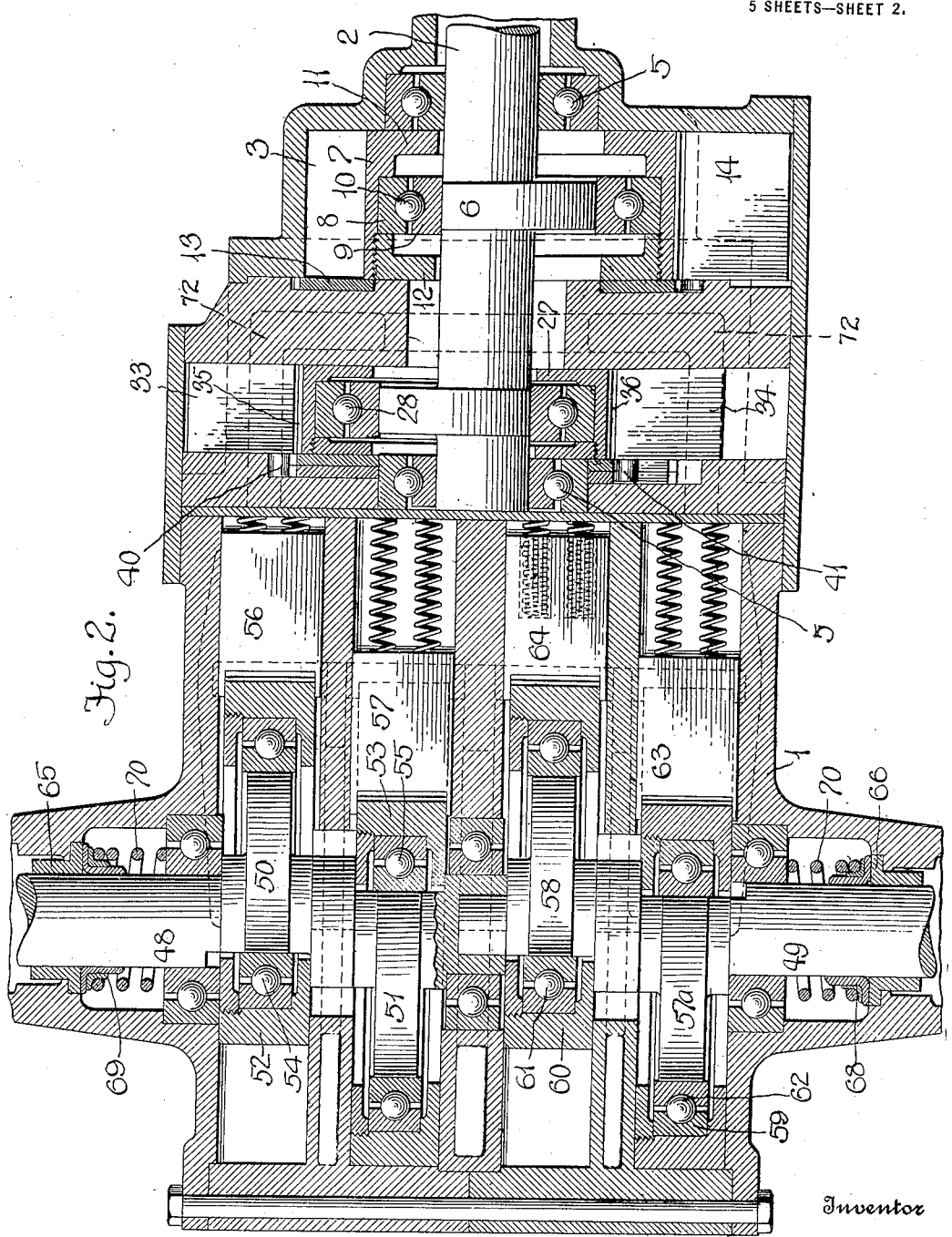

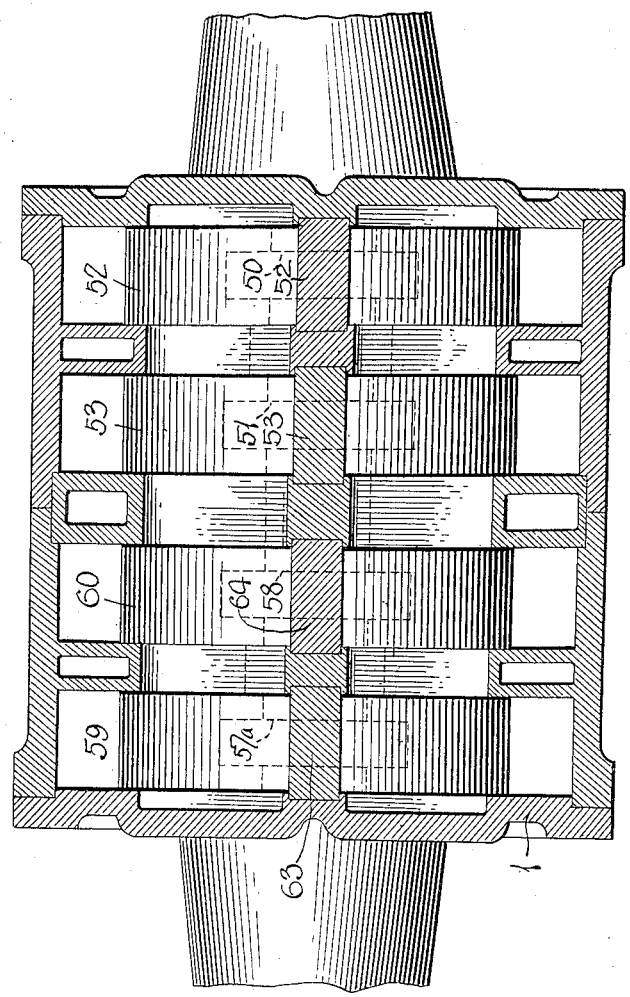

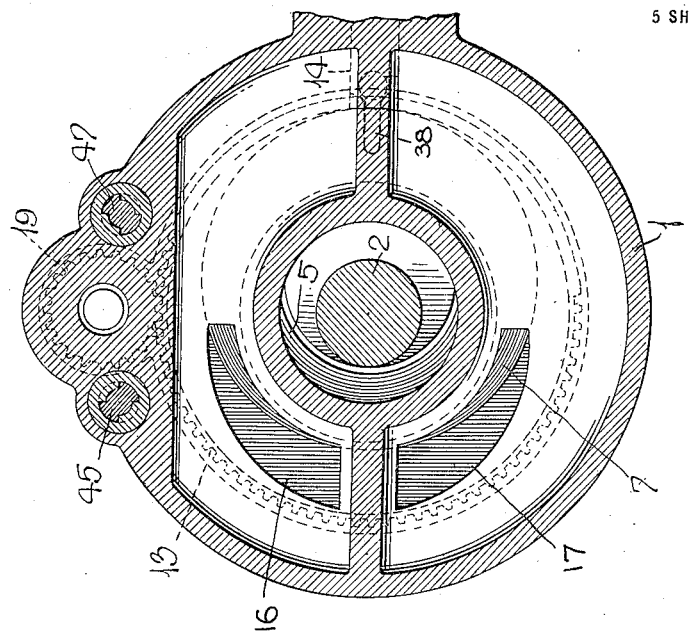
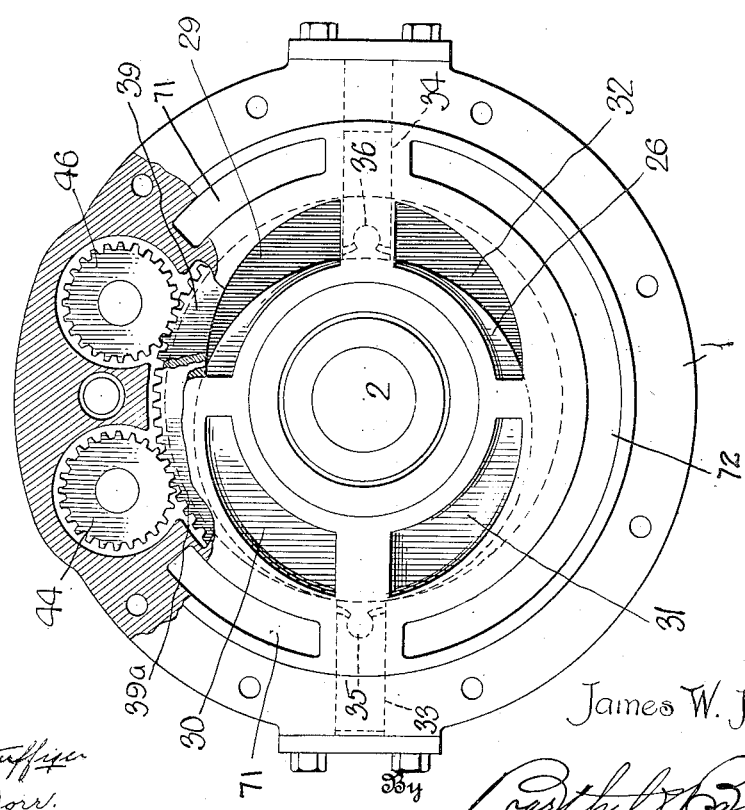

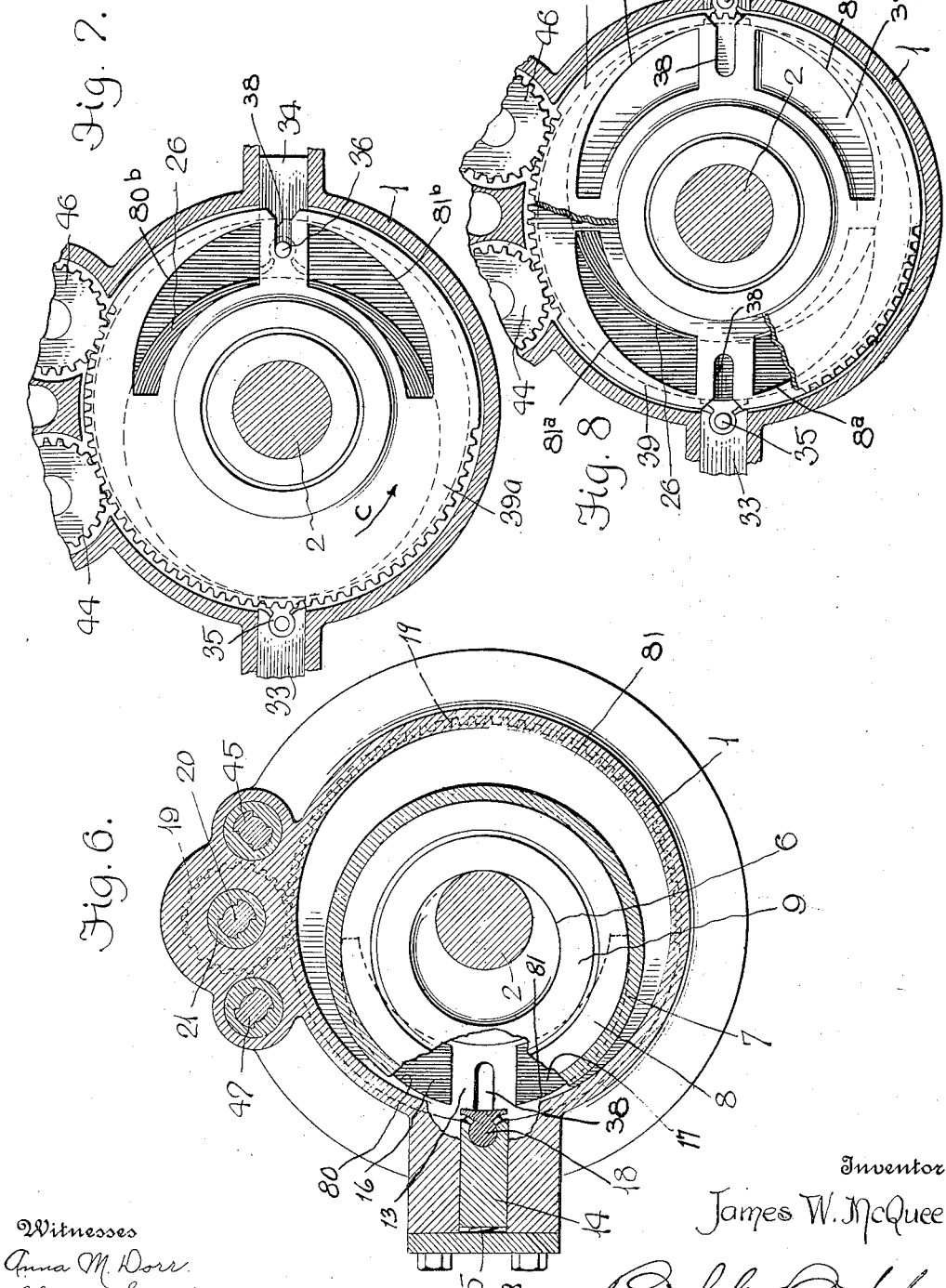

JAMES W. McQUEEN, OF DETROIT, MICHIGAN.

DRIVING MECHANISM.

1,380,401. Specification of Letters Patent. Patented June 7, 1921.

Application filed February 1, 1915. Serial No. 5,342.

*To all whom it may concern:*

Be it known that I, JAMES W. McQUEEN, a citizen of the United States of America, residing at Detroit, in the county of Wayne and State of Michigan, have invented certain new and useful Improvements in Driving Mechanism, of which the following is a specification, reference being had therein to the accompanying drawings.

This invention relates to driving mechanism for transmitting power from one rotatable member to a differential follower member or from one driving shaft to other driven shafts by the use of fluid that is forced from suitable means operated by the driving shaft into motors that are directly coupled to the following members. The invention includes means for varying the relative speeds of the driving and follower members, and for reversing the direction of motion of the follower members in relation to the driving shaft.

As herein illustrated and described the mechanism is particularly adapted for use on motor vehicles or the like wherein a driving shaft transmits power through the device to the transversely disposed members of a differential follower shaft.

The invention consists in the matters hereinafter set forth and more particularly pointed out in the appended claims.

In the drawings,

Figure 1 is a view in longitudinal section of a mechanism that embodies features of the invention;

Fig. 2 is a view in longitudinal section taken at right angles to the plane of Fig. 1 and in substantially the plane of the follower or driven shafts;

Fig. 3 is a view in detail taken on or about line III—III of Fig. 1;

Fig. 4 is a view in detail taken on or about line IV—IV of Fig. 1; showing a change speed and reversing valve mechanism;

Fig. 5 is a view in section taken on or about line V—V of Fig. 1;

Fig. 6 is a view in section of the pump taken on the line VI—VI of Fig. 1; and

Figs. 7 and 8 are views in section taken on or about line VIII—VIII of Fig. 1 showing the operation and relation of controlling valves.

As herein shown, a casing 1 that is designed to combine strength and lightness and is formed of parts suitably designed to facilitate machining and assembling, affords support for the inner end portion 2 of a driving shaft that extends through an outer or pump chamber 3 and an inner pump chamber shown at 4, suitable bearings 5 being provided of a type to minimize the friction. An eccentric 6 is formed on or secured to the driving shaft to lie within the chamber 3. A facing member 7 is rotatably secured on the eccentric 6 as by interposed raceways 8 and 9 and anti-friction balls 10. The facing member 7 which is herein shown with a fixed flange 11 and detachable flange 12 whereby it may be readily assembled, is in sliding engagement with the walls of the chamber 3 so as to sweep ports 80 and 81 of a rotatable cut off member or disk 13 positioned to control ports 16 and 17, respectively, of the inner wall of chamber 3. 14 indicates an abutment located in a pocket of the casing and radially disposed relative to the axis of chamber 3, said abutment being adapted to be projected into the chamber by springs 15 or the like, when permitted by disk 13, the abutment at such time serving to produce a division in the chamber between upper port 16 and lower port 17. As a detail of good construction, leakage between the end face of the abutment, and the facing member 7 is prevented by means of a suitably designed shoe 18 that is pivotally interlocked with the end of the abutment. The cut off disk 13, is provided with gear teeth or a peripheral gear which is in mesh with an operating pinion 19. A longitudinally shiftable screw 20 of suitable pitch and character for this purpose, engages the interiorly screwthreaded and elongated hub 21 of the pinion 19 whereby the operator may turn the disk 13 as desired, by endwise movement of the screw 20 and consequent rotation of the pinion 19. Ports 80 and 81 are of similar contour and area to ports 16 and 17, and disk 13 is shiftable in a rotatable direction between positions in which the ports are in registration and where ports 16 and 17 are closed.

The ports 16 and 17 are the inlets of ducts 71 and 72 respectively that extend through the casing to an upper distributing compartment 22 and a similar lower chamber 23, a division wall 24 separating the latter.

Disk 13 is provided with a radial slot 38, extending inward from the disk periphery (Fig. 6), this slot being movable into and out of position relative to a pin or lug (similar to pins or lugs 40 and 41 presently described) by rotative movements of the disk through operation of gear 19. When the slot and pin or lug are in alinement—as in Fig. 6—abutment 14 is free to reciprocate in following the movement of the eccentric assembly thus forming a positive partition with port 16 above the plane of the partition and port 17 below such plane. Slot 38 is positioned on the disk so as to permit this abutment movement when ports 80 and 81 are in registration with ports 16 and 17. When disk 13 is rotated to close ports 16 and 17, the reciprocating movement of the abutment is prevented, the pin resting on the edge of the disk, so that the partition effect is absent, and rotation of the eccentric assembly simply moves the fluid contents of chamber 3 in a continuous circular path, the inlet and outlet to the chamber being closed to the fluid at such times.

Another pump eccentric assembly 26 is formed on or secured to the driving shaft within the chamber 4, and, like the other eccentric assembly 6 has a flanged facing 27 that is rotatably secured thereon as by interposed anti-friction bearings indicated generally at 28, so as to ride in sliding engagement with the side walls of the chamber 4 to control an upper pair of ports 29 and 30 (see Fig. 4) opening into the upper distributing compartment 22 (see Fig. 1), and a lower pair of ports 31 and 32 that open into the lower distributing chamber 23. A pair of radially disposed and oppositely arranged abutments 33 and 34 with facing shoes 35 and 36 are yieldingly projected from pockets in the casing by suitable spring members against the facing member 27.

Abutments 33 and 34 have slightly recessed ends to retain the facing shoes, and are preferably slightly wider than the peripheries of the facing member of the eccentric assembly, the casing walls having a proper configuration to receive them. Each abutment carries pins or lugs 40 or 41 (Fig. 2) adapted to enter a slot 38 of each of a pair of cut-off members 39 and 39$^a$ arranged to control ports 29 to 32 inclusive these members each having a pair of ports, member 39 having ports 80$^a$ and 81$^a$ and member 39$^a$ having ports 80$^b$ and 81$^b$—similar to disk 13—which ports may be placed in or out of registration with each other and with ports 29 to 32. For instance, in Fig. 7, the ports 80 and 80$^b$ of both members 39 and 39$^a$ are in registration with each other and with port 29, ports 81$^a$ and 81$^b$ of the members being in registration with each other and with port 32, slots 38 of the members being in registration and positioned opposite pin or lug 41, Figs. 2 and 7 showing the pin located at the bottom of the slots, abutment 34 being active in producing the partition effect in chamber 4. As members 39 and 39$^a$ have but the two ports 80$^a$ and 81$^a$ and 80$^b$ and 81$^b$, respectively, it will be understood that in the position of Fig. 7 ports 30 and 31 are closed, the result being that communication is had between compartment 22 and chamber 4 through ports 29, 80 and 80$^b$ and between chambers 23 and 4 through ports 32, 80$^b$ and 81$^b$. When members 39 and 39$^a$ are in this position abutment 34 is held in its outer position by the edges of said members, thus providing chamber 4 with a single active abutment.

If gears 44 and 46 be operated to shift both members 39 and 39$^a$ 180 degrees abutment 33 will be made active through slots 38 being placed in alinement with pin or lug 40, abutment 34 being rendered inactive. This change closes ports 29 and 32 and opens ports 30 and 31, communication between compartment 22 and chamber 4, being through ports 30, 81$^a$ and 81$^b$, and between chambers 23 and 4 through ports 31, 80$^a$ and 80$^b$.

This shifting of members 39 and 39$^a$ serves to change the delivery and discharge of fluid to and from chamber 4 from one side to the other of a vertical plane extending diametrically through chamber 4.

If but one of the members 39 or 39$^a$ is shifted from the position of Fig. 7 to the opposite position,—producing the position of Fig. 8—all of ports 29 to 32 will be closed and abutments 33 and 34 both rendered inactive, closing all communication with chamber 4 the contents of the latter simply moving within chamber through the absence of any partition effect.

To provide the movements of members 39 and 39$^a$, each is provided with gear teeth meshing with pinions 44 and 46 respectively, these being manipulated by the action of screw push rods 45 and 47 respectively.

As will be understood, when either chamber 3 or 4 is closed from communication with compartment 22 and chamber 23, the partition effect is also eliminated thus making the pump of the closed chamber inactive. By the change from one side to the other of the diametric plane of chamber 4, the chamber is retained active but the direction of flow of the fluid therethrough is reversed. For instance, in the position of Fig. 7 the flow will follow the path indicated by arrows $a$ and $b$ in Fig. 1—the direction set up when chamber 3 is active; when members 39 and 39$^a$ are reversed, the direction of flow will be the reverse of that indicated by the arrows.

This general arrangement permits variation in action. For instance if chamber 3 is closed and chamber 4 be as shown in Fig. 7, flow of fluid in the direction of the arrows will be had with quantity movement controlled by the volume of fluid acted on in chamber 4. If the position of members 39 and 39ᵃ is reversed, the flow will be in the opposite direction but of similar volume. If chamber 4 be closed and chamber 3 opened the flow will be as shown by the arrows but in increased volume due to the larger capacity of the pump of chamber 3. And if chamber 4 be also opened with the parts arranged as in Fig. 7 the volume will be correspondingly increased since both pumps are then active. Obviously, chamber 3 will be closed when chamber 4 is opened with members 39 and 39ᵃ in the reversed position from that shown in Fig. 7.

A pair of oppositely disposed alined driven shafts or follower members 48 and 49 are journaled in the casing 1 transversely to the main shaft 2. A pair of oppositely disposed or symmetrically arranged motor eccentric disks 50 and 51 on the shaft 48 carry facing members 52 and 53 similar to those of the pump and which are rotatable on interposed bearings shown at 54 and 55, the elements 50 and 51 being arranged so as to control ports that open respectively from either the upper compartment 22 or the lower compartment 23 of the distributing chamber.

Yieldingly projected radially disposed abutments 56 and 57 coöperate with the motor disks 50 and 51 and their facings 52 and 53 in the usual manner of rotary motors of this type to control and open the ports for inlet and return from the chambers 22 and 23 respectively, or vice versa, as conditions obtain.

Similarly the shaft 49 has eccentrics 57ᵃ and 58 with facing members 59 and 60 revoluble thereon on suitable bearings indicated at 61 and 62 to control ports from the compartments 22 and 23 of the distributing chamber in conjunction with radial yielding projected abutments 63 and 64. As will be understood all of the chambers in which motor disks 50, 51, 57ᵃ and 58 operate are in communication with compartment 22 and chamber 23, the particular arrangement of the disks providing two units with one unit capable of variable movement relative to the other unit, each unit in turn, being arranged with two motor disks positioned in opposite relation to the abutments. In common with the pump construction, the motor structure is such that the oil or fluid used is free to work its way from the various chambers to the bearings to keep the parts thoroughly lubricated this being done by affording sufficient clearance around the shafts where they pass through the division walls between the respective chambers. This construction is taken further advantage of in the case of the differential shafts to thoroughly lubricate and pack thrust bearings indicated respectively at 65 and 66 leakage being prevented in either instance by flexible washers 68 and annular keepers 69 with holding springs 70. Other arrangements and dispositions of the pumps in relation to the driving motors may of course be had by suitable disposition and arrangement of the various chambers for the pumps, and control thereof by the coöperating parts. As herein shown a maximum quantity of oil or other fluid may be forced through the lower compartment into the motors for direct drive by the coöperative efforts of both pumps, the return of the operating fluid being of course through the other compartment. By cutting out the smaller pump through retention of the abutments 33 and 34 in retracted position by suitable shifting of the cut off 39 and companion part 39ᵃ, the larger pump operates without the small one to produce an intermediate speed. Similarly by use of the smaller pump only low speed is obtained in the motors. The smaller pump only is used ordinarily for reversing purposes as herein indicated although obviously if preferred for some purposes both pumps could be used by a suitable arrangement of the controlling closures.

One feature of the construction is the absence of gearing between the driving and driven members either for transmitting the torque of the driving member or for producing the necessary differential movement in the driven or follower members, the pumps automatically permitting the required variation in speed or lag of one shaft behind the other in accordance with the load encountered. Of course the disposition of the ducts and proportion thereof to permit the passage of the fluid that is used, preferably oil or the like, is to be understood and the design is that which follows good shop and engineering practice.

The direction of rotation of the pumps in the particular embodiment shown, is as shown by the arrow c in Fig. 7. When members 39 and 39ᵃ are in the position shown in this view, the pumping action is effective below abutment 34 thus driving the contents out through port 32, the fluid being received through port 29. However, if the positions of members 39 and 39ᵃ are reversed, abutment 33 becoming active, the pumping action is effective above abutment 33 to discharge the contents through port 30, the intake being through port 31, it being understood, of course, that the direction of rotation of shaft 2—clockwise in Figs. 1 and 2—remains constant. As ports 31 and 32 are open to chamber 23 while ports 29 and 30 are open to compartment 22, it will be understood that the reversal of position of members 39 and 39ᵃ will cause a reversal in the direction of circulating flow through compartment 22 and chamber 23.

Obviously, if both chambers 3 and 4 be closed, circulation will cease, the contents of each of these chambers simply moving in the chamber in which it is held if shaft 2 continues its rotation, thus rendering the motor disks inactive.

Obviously, changes in the details of construction may be made without departing from the spirit of the invention, and I do not care to limit myself to any particular form or arrangement of parts.

What I claim is:—

1. A driving mechanism comprising a power shaft, pumps of different capacity connected thereto, a pair of driven shafts, a fluid operated motor connected to each driven shaft directly, means controlling the flow and return of driving fluid from the pumps to the motors for driving the motors in either direction of rotation in relation to the pump movement, said controlling means being operative to selectively control the activity of the pumps relative to the fluid flow, and means rendered active by said control means for retaining the contents of an inactive pump within the pump chamber.

2. A driving mechanism comprising a driving shaft, a housing therefor containing rotary pump chambers adjacent the shaft, a differential shaft comprising two shaft members in the casing and in operative relation to rotary motor chambers formed in the casing, rotary pump members secured to the driving shaft each in operative relation to a pump chamber, rotary motor members each secured to a driven shaft in operative relation to a casing motor chamber, reversing and regulating means controlling the direction of flow and return of fluid from the pumps to the motors for obtaining reversal of movement of the motors, and means in the casing for throwing the pumps out of operation and retaining the pump contents of an inactive pump within its chamber.

3. A driving mechanism comprising a casing forming a housing for a driving shaft and a differential shaft having two alined oppositely disposed driven members, with pump chambers of different capacities adjacent the driving shaft and motor chambers adjacent the driven differential members, eccentric pump pistons on the driving shaft each operating in a pump chamber, eccentric motor pistons on the differential driven shaft members each in operative relation to a motor chamber, means controlling the flow of fluid from the pumps to the motors, for reversing the direction of the motion of the latter, and means for throwing a pump out of operation.

4. A driving mechanism comprising a casing forming a housing for a driving shaft, and a differential shaft having two alined oppositely disposed driven members, with pump chambers of different capacities adjacent the driving shaft and motor chambers adjacent the driven differential members, eccentric pump pistons on the driving shaft each operating in a pump chamber, eccentric motor pistons on the differential driven shaft members, each in operative relation to motor chamber, means controlling the flow of fluid from the pumps to the motors, for reversing the direction of motion of the latter, means for throwing a pump out of operation, and abutments reciprocating in guideways in yielding contact with the several pump and motor pistons.

5. In a driving mechanism, a casing, a driving shaft extending into the casing, rotary pump chambers in the casing encircling the shaft, a pair of differential driven shafts journaled in alined relation in the casing, eccentric motor chambers in the casing around the differential shaft, rotary pump pistons on the driving shaft each in operative relation to a companion pump chamber and in contact therewith, abutments yieldingly projected through suitable guideways of the casing to contact with the several pump and motor pistons, a valve controlling the passages connecting the pump and inlet with the motor inlet and outlet for reversing direction of motion of the latter, and means for holding the abutment members of the pumps out of operative relation to the companion pump pistons.

6. In a driving mechanism, a casing, a driving shaft extending into the casing through rotary pump chambers therein, eccentric rotary pump pistons secured on the shaft each in a pump chamber, facing members on the pistons in sliding engagement with the surfaces of the chambers and in rotatable engagement with the piston bodies, abutments reciprocal in guideways in the casing in yielding engagement with the facing members of the respective pistons, a pair of differential driven shaft members journaled in the casing in rotary motor chambers, motor pistons secured on the driven shaft each operating in a motor chamber, facings journaled on the piston members in engagement with the faces of the motor chambers, abutments yieldingly projected from suitable guideways into abutting relation with the companion facing members, valve members in the casing controlling the flow from the pumps to the motor for reversing the direction of motion of the latter, and means in the casing for holding the abutments of the pump out of operative relation to the companion piston.

7. A driving mechanism comprising a casing having rotary pump chambers and rotary motor chambers therein in communication through suitable passages between the outlet and inlet of the chambers respectively, a driving shaft journaled in the casing in the pump chambers, a pair of differential driven shafts journaled in the casing in operative relation to the motor chamber, rotary pump pistons on the driving shaft each in operative relation to a pump chamber, abutments in the several chambers each yieldingly projected against the companion piston, means in the casing for regulating the amount and direction of flow from each pump chamber to the motor chamber, and means in the pump chamber adapted to intersect and hold a companion abutment in inoperative relation to the associated piston.

8. A driving mechanism comprising a casing having chambers for rotary pumps therein provided with outlet and inlet ports and with abutments yieldingly moving inwardly between the ports, chambers for rotary motors having ports connected through ducts in the casing, with the ports of the pump chambers and abutments therebetween yieldingly projected into the chambers respectively, a driving shaft journaled in the casing in the pump chambers, a rotary piston for each pump chamber secured on the driving shaft, a facing member journaled on each rotary piston in engagement with the walls of the chamber and with the projected abutments, a rotatable cut off member for each pump chamber adapted to regulate the flow from the ports thereof, and to connect the ports with the ports of the motor chamber, and means in the pump chambers for holding the pump abutments in inoperative relation to the associated piston.

9. A driving mechanism comprising a casing, a driving shaft extending into the casing and through chambers for rotary pumps therein, a pair of alined differential driven shafts extending into the casing through chambers for rotary motors, the chambers of the pumps having ports associated through ducts in the casing with ports in the several motor chambers, valves for regulating the direction of flow from the pump ports to the motor ports respectively, a rotary piston for each pump chamber secured on the driving shaft and provided with a peripheral rotatable facing in engagement with the walls of the chamber, abutments for the several pump chambers yieldingly projected against the facings, means in the casing for selectively holding an abutment out of relation to the associated piston, rotary motor pistons each secured on the driven shaft in operative relation to a motor chamber and provided with rotatable facing members each in engagement with the walls of a companion chamber, abutments for the motor chambers yieldingly projected into engagement with the motor piston facing members, and means for manually shifting the several valves and abutment controlling members.

10. A driving mechanism comprising a casing, a driving shaft extending into the casing through the chambers therein formed for rotary pumps, an eccentric pump piston for each chamber secured to the driving shaft and adapted to control ports to the chamber walls with which it is in contact, abutments for the chambers each yieldingly projected into sliding engagement with the respective pistons within the ports, a disk rotatable on the shaft between the piston chamber wall and the piston provided with openings adapted to register with the port opening, and with a stop in which the companion abutment is reciprocable when the openings are in register with the ports only, and means for manually shifting the disks.

11. A driving mechanism comprising a casing, a driving shaft extending into the casing through chambers therein formed for rotary pumps, an eccentric pump piston for each chamber secured to the driving shaft, a peripheral facing member for each piston eccentric that is rotatable thereon and is in engagement with the chamber walls to control the inlet and outlet ports thereto, abutments for the chambers each yieldingly projected into engagement with the companion facing member between the ports, a disk rotatable on the shaft interposed between an eccentric and the ports that it controls and provided with openings adapted to register with the ports, gear teeth on the periphery of the disk, a pinion rotatable in the casing in mesh with the gear teeth and a screw threaded non-rotatable push rod longitudinally reciprocal in the casing in screw threaded engagement with the hub of the pinion for rotating the latter.

12. A driving mechanism comprising a casing, a driving shaft extending into the casing through chambers therein formed for rotary pumps, an eccentric pump piston for each chamber secured to the driving shaft, a peripheral facing member for each piston eccentric that is rotatable thereon and is in sliding engagement with the chamber walls to control the inlet and outlet ports thereto, abutments for the chambers each yieldingly projected into engagement with the companion facing member between the ports, a disk rotatable on the shaft interposed between an eccentric and the ports that it controls and provided with openings adapted to register with the ports, gear teeth on the periphery of the disk, a pinion rotatable in the casing in mesh with the gear teeth, a screw threaded push rod longitudinally and non-rotatably reciprocal in the casing in the threaded engagement with the hub of the pinion for rotating the latter, the disk having a substantially radial slot adapted to be engaged by the companion abutment when the ports are in register only whereby the abutment is free to coöperate with the piston only when such registration of ports occurs.

13. A driving mechanism comprising a casing, a driving shaft extending into the casing through chambers therein formed for rotary pumps, an eccentric rotary pump piston for each chamber secured to the driving shaft in engagement with the chamber walls adapted to control inlet and outlet ports thereto, the casing having a distributing chamber with two compartments each in connection with the outlet and inlet ports of the pump chambers, abutments for the chambers yieldingly projected in engagement with the respective eccentric pistons between the ports, a disk rotatable on the shaft interposed between the ports of a chamber and the companion piston and provided with a slot in which the companion abutment reciprocates only when the ports of the chamber are in register with openings of the disk, means for shifting the disk, a two-part disk interposed between another piston member and the inlet and outlet ports of the chamber that it controls each part being separably rotatable whereby either set of ports from the chamber may be thrown into communication with the corresponding compartments of the distributing chambers, means for shifting the parts of the disk, a pair of driven shafts, a fluid operated motor connected to each driven shaft and operatively connected to the compartments of the distributing chamber whereby the motors are driven by the combined or selective action of the several pumps.

14. A driving mechanism comprising a casing having chambers for rotary pumps with inlet and outlet ports therein each in communication with one of two compartments in a distributing chamber in the casing and with chambers for rotary motors having inlet and outlet ports likewise in communication with the several compartments of the distributing chamber, a drive shaft journaled in the casing through the pump compartments, a pair of differential shafts journaled in the casing through the motor chambers, eccentric pump pistons in the pump chambers secured to the driving shaft and adapted to control the ports of the chambers, eccentric motor pistons secured on the differential shafts each in a motor chamber and adapted to control the ports of the chambers, means for confining and directing the flow from the corresponding ports of the pumps to enter the compartments of the distributing chamber selectively, abutments for the several chambers yieldingly projected against the pump and motor pistons for coöperating with the latter and means for regulating the distributing means, said latter means being adapted to hold the companion abutment out of operative relation with the associated pump piston when in shut off position.

In testimony whereof I affix my signature in presence of two witnesses.

JAMES W. McQUEEN.

Witnesses:
C. R. STICKNEY,
G. E. McGRANN.